(12) United States Patent
Wiemker (10) Patent No.: US 8,971,608 B2
(45) Date of Patent: Mar. 3, 2015

(54) VOLUMETRIC RENDERING OF IMAGE DATA

(75) Inventor: Rafael Wiemker, Kisdorf (DE)

(73) Assignee: Koninklijke Philips N.V., Eindhoven (NL)

( * ) Notice: Subject to any disclaimer, the term of this patent is extended or adjusted under 35 U.S.C. 154(b) by 72 days.

(21) Appl. No.: 13/992,531

(22) PCT Filed: Dec. 1, 2011

(86) PCT No.: PCT/IB2011/055407
§ 371 (c)(1),
(2), (4) Date: Jun. 7, 2013

(87) PCT Pub. No.: WO2012/077019
PCT Pub. Date: Jun. 14, 2012

(65) Prior Publication Data
US 2013/0259351 A1 Oct. 3, 2013

Related U.S. Application Data

(60) Provisional application No. 61/421,350, filed on Dec. 9, 2010.

(51) Int. Cl.
*G06K 9/00* (2006.01)
*G06T 11/00* (2006.01)
G06K 9/52 (2006.01)
*G06T 7/00* (2006.01)
*G06T 7/60* (2006.01)
*G06T 15/08* (2011.01)
*G06T 19/20* (2011.01)

(52) U.S. Cl.
CPC .............. *G06T 11/003* (2013.01); *G06K 9/525* (2013.01); *G06T 7/0081* (2013.01); *G06T 7/602* (2013.01);

(Continued)

(58) Field of Classification Search
CPC ....... G06T 17/00; G06T 11/003; G06T 15/08; G06T 2207/10072; G06T 7/0081; G06T 7/602
USPC ................................................. 382/131, 132
See application file for complete search history.

(56) References Cited

U.S. PATENT DOCUMENTS 7,684,602 B2 3/2010 Cathier et al.
2003/0225546 A1* 12/2003 Alfano et al. ................. 702/150

(Continued)

FOREIGN PATENT DOCUMENTS

EP 1915740 B1 4/2008

OTHER PUBLICATIONS

Wu et al: "Stratified Learning of Local Anatomical Context for Lung Nodules in CT Images"; 2010 IEEE Conference on Computer Vision and Pattern Recognition (CVPR), pp. 2791-2798.
Frangi et al: "Multiscale Vessel Enhancement Filtering", Medical Image Computing and Computer-Assisted Intervention-MICCAI'98, 1998, pp. 130-137.

(Continued)

*Primary Examiner* — Amir Alavi
*Assistant Examiner* — Kenny Cese (57) ABSTRACT

A method includes obtaining image data generated by an imaging system (100), generating data indicative of a degree to which each of a plurality of voxels of the image data corresponds to one or more predetermined geometrical features, wherein each geometrical feature is assigned a different color, generating a signal indicative of a single color value for each of the plurality of voxels based on the degree and the colors, generating a volumetric rending of the image data based on the signal, generating a link between voxels of the volumetric rendering and voxels of the image data, and visually presenting the image data and the volumetric rendering concurrently. The geometrical features represent local shape features which are determined by ray casting with the rays being used for the computation of a quadric represented by a matrix and with the eigenvalues of said matrix determine the degree to which voxels correspond to some local geometric shape features (i.e. blobness, tubularness).

17 Claims, 4 Drawing Sheets (52) U.S. Cl.
CPC ............... *G06T 15/08* (2013.01); *G06T 19/20* (2013.01); *G06T 2207/10072* (2013.01); *G06T 2207/30096* (2013.01); *G06T 2207/30101* (2013.01); *G06T 2219/2012* (2013.01)
USPC .......................................... 382/131; 382/132

(56) References Cited

U.S. PATENT DOCUMENTS

| | | |
|---|---|---|
| 2005/0105786 A1 | 5/2005 | Moreau-Gobard et al. |
| 2005/0105829 A1 | 5/2005 | Cathier |
| 2005/0110791 A1 | 5/2005 | Krishnamoorthy et al. |

OTHER PUBLICATIONS

Sato et al: "Tissue Classification Based on 3D Local Intensity Structures for Volume Rendering"; IEEE Transactions on Visualization and Computer Graphics, vol. 6, No. 2, Apr.-Jun. 2000. pp. 160-180.

Stetten et al: "Medial-Node Models to Identify and Measure Objects in Real-Time 3-D Echocardiography"; IEEE Transactions on Medical Imaging, vol. 18, No. 10, Oct. 1999, pp. 1025-1034.

Wiemker et al: "Filter Learning and Evaluation of the Computer Aided Visualization and Analysis (CAVA) Paradigm for Pulmonary Nodules Using the LIDC-IDRI Database"; Proceedings of SPIE, vol. 7624, pp. 7624U-1-7624U-12, date 2010.

* cited by examiner

VOLUMETRIC RENDERING OF IMAGE DATA

This application is a 371 of PCT/IB11/55407 12/01/2011 which claims benefit of 61/421,350 Dec. 9, 2010

FIELD OF THE INVENTION

The following generally relates to visualizing image data and in particular to generating and displaying a volumetric rendering of image data, and is described with particular application to computed tomography (CT); however, the following is also amenable to other imaging modalities such as, but not including, positron emission tomography (PET), single photon emission tomography (SPECT), magnetic resonance imaging (MRI), ultrasound (US), three dimensional (3D) x-ray, and/or other imaging modalities.

BACKGROUND OF THE INVENTION

A computed tomography (CT) scanner includes an x-ray tube that emits radiation that traverses an examination region and a portion of an object or subject therein. A detector detects radiation traversing the examination region and generates projection data indicative of the detected radiation. A reconstructor reconstructs the projection data and generates volumetric of image data indicative of the portion of the object or subject in the examination region. The image data is voluminous, and sub-volumes of the image data typically are sequentially visualized via a display through a series of two-dimensional (2D) slices in an axial, sagittal, coronal and/or oblique plane making up the image data. Generally, the user scrolls through the sub-volumes, selecting and/or changing the slice plane and/or the slice thickness, and utilizes various standard visualization tools such as zoom, rotate, pan, etc.

Unfortunately, while scrolling through the large volume of image data, small nodules, such as lymph nodes or tumors, or vessels can be easily overlooked and/or visually occluded by other structure, and the evaluation of these structures may be essential for oncologic diagnosis, staging and therapy monitoring, as well as other medical applications. Nodules and vessels can be explicitly identified and segmented via state of the art computer aided detection approaches, with discrete labeling effectively applied to each voxel of the input image volume. Unfortunately, such labeling will necessarily have a certain error rate, and the inherent uncertainty generally will not be visible to the clinician evaluating the image data. As such, regulatory approval for this kind of computer aided detection and segmentation may be difficult and costly to achieve. Furthermore, a change to the original input image data volume by applying graphical markers may be less than desirable since visual perception of the clinician is trained on original image data.

SUMMARY OF THE INVENTION

Aspects of the present application address the above-referenced matters and others.

According to one aspect, a method includes obtaining image data generated by an imaging system, generating data indicative of a degree to which each of a plurality of voxels of the image data corresponds to one or more predetermined geometrical features, wherein each geometrical feature is assigned a different color, generating a signal indicative of a single color value for each of the plurality of voxels based on the degree and the colors, generating a volumetric rending of the image data based on the signal, generating a link between voxels of the volumetric rendering and voxels of the image data, and visually presenting the image data and the volumetric rendering concurrently.

According to another aspect, a computing system includes computer readable storage medium, including one or more instructions corresponding to at least one volume rendering algorithm. The computing system further includes one or more processors configured to execute the one or more instructions to generate a volumetric rendering of image data in which structure represented in the image data and having a predetermined shape of interest is colored coded based on the predetermined shape of interest and local quadric properties of voxels of the image data.

According to another aspect, computer readable storage medium encoded with computer readable instructions, which, when executed by one or more processors of a computing system, cause the computing system to display an interactive graphical viewer concurrently presenting image data and a volumetric rendering of the image data, wherein the volumetric rendering is generated based on local quadric properties of voxels of the image data.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF EMBODIMENTS

Figure 1:
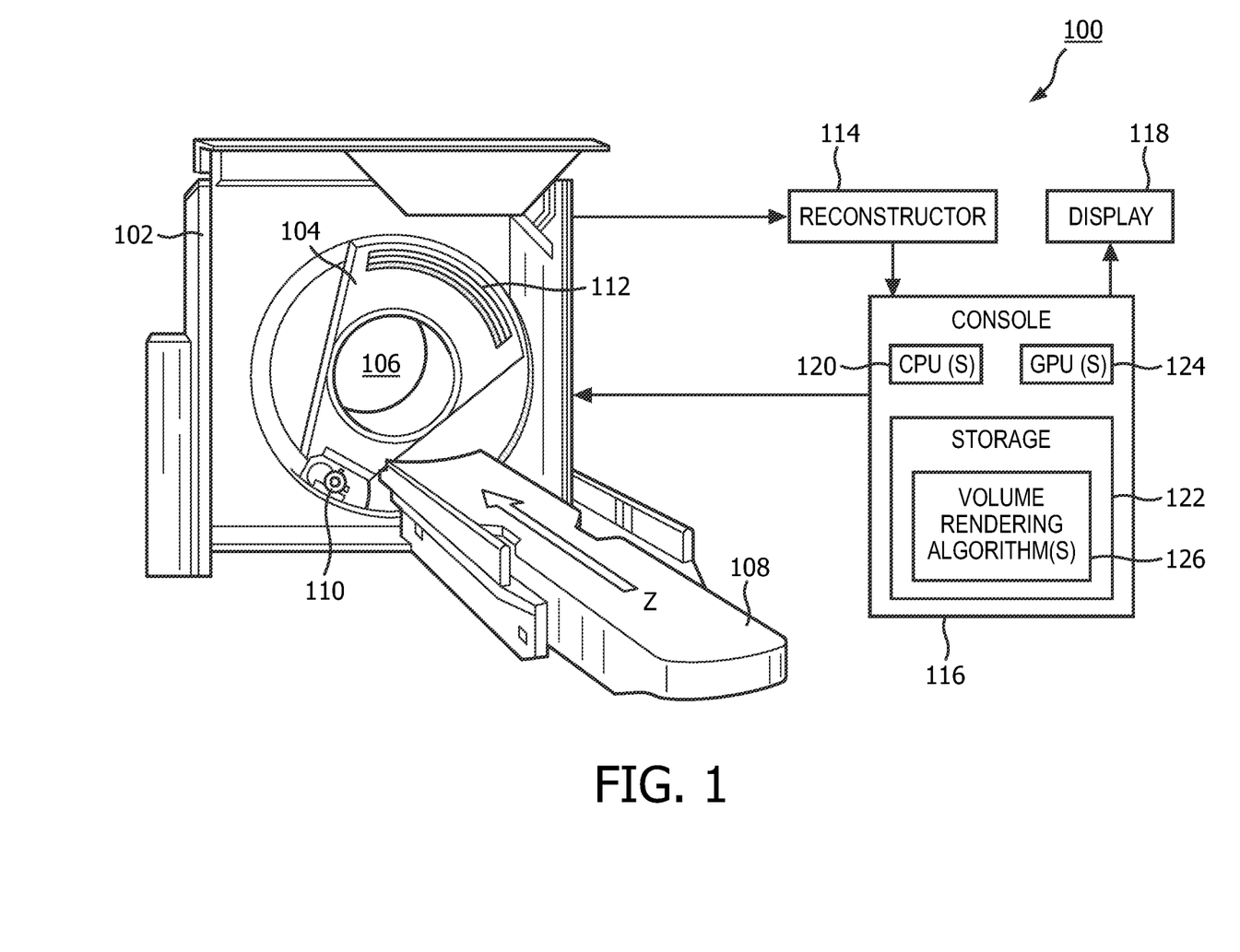
FIG. 1 schematically illustrates an example imaging system with a console that employs one or more visualization algorithms for generating and displaying a volumetric rendering based on the image data generated by the imagine system and/or other imaging system.

FIG. 1 illustrates an imaging system such as a computed tomography (CT) scanner 100. The scanner 100 includes a stationary gantry 102 and a rotating gantry 104, which is rotatably supported by the stationary gantry 102. The rotating gantry 104 rotates around an examination region 106 about a longitudinal or z-axis. A patient support 108, such as a couch, supports a patient in the examination region 106 and is movable along the x, y and/or z-axis in coordination with the rotation of the rotating gantry 104 to facilitate helical, axial, or other desired scanning trajectories.

A radiation source 110, such as an x-ray tube, is supported by and rotates with the rotating gantry 104 around the examination region 106. The radiation source 110 emits radiation that is collimated by a source collimator (not shown) to produce a generally fan, wedge, or cone shaped radiation beam that traverses the examination region 106. A radiation sensitive detector array 112 detects radiation that traverses the examination region 106 and generates projection data indicative of the detected radiation. A reconstructor 114 reconstructs the projection data and generates volumetric image data indicative of the examination region 106.

A general purpose computing system serves as an operator console 116, and includes an output device such as a display 118 and an input device such as a keyboard, mouse, and/or the like. The console 116 includes at least one central processing unit (CPU) 120 and computer readable storage medium 122 (e.g., physical memory) encoded or embedded with computer readable instructions, which, when executed by the at least one CPU 120 allows a user to operate the system 100 such as initiating scanning, selecting a graphics volumetric rendering algorithm, etc. Additionally or alternatively, the at least one CPU 120 can execute computer readable instructions carried in signal medium (e.g., a carrier wave). Furthermore, the storage medium 122 may include one or more storage units, located locally on and/or remote from the console 116.

The illustrated console 116 also includes at least one graphical processing unit 124 (GPU) for rendering two-dimensional (2D) and/or three-dimensional (3D) graphics. The GPU 124 can execute computer readable instructions, such as a selected graphics volumetric rendering algorithm, encoded stored on the computer readable storage medium 122 and/or the signal medium. It is to be appreciated that the GPU 124 may be part of one or more video cards installed in one or more expansion slots of the console 116 and/or one or more video controllers installed on the mother board. In another embodiment, the GPU 124 is located on a computing device (e.g., a picture archiving and communication systems (PACS) or other system) separate and remote from the console 116. In yet another instance, the GPU 124 is omitted, and the one or more processor 120 renders the two-dimensional (2D) and/or three-dimensional (3D) graphical representations.

The illustrated storage medium 122 includes at least one volume rendering algorithm 126. In one non-limiting instance, the GPU 124 and/or the one or more processors 120, when executing the volume rendering algorithm 126, visually presents an interactive graphical user interface (GUI) concurrently displaying the original image data (e.g., via axial, sagittal, coronal, or oblique slices) and a volumetric rendering of the image data. In such an instance, the image data and the volumetric rendering can be spatially linked, and the volumetric rendering can serve as a quick overview and navigator to points of interest, such as lymph nodes, tumors, and/or vessels, in the image data. In another embodiment, the volumetric rendering can be visually presented without the image data and vice versa. The interactive GUI allows for standard and/or other visualization tools such as rotate, pan, zoom, etc.

As described in greater detail below, the volumetric rendering can be based on an efficient estimation of a local quadric around each voxel in the image data in which the fit of the local quadrics does not use derivatives and is independent of the object size, resulting in noise-robustness and mitigating a scale space computation and storage. Generally, in this instance, eigenvalues are determined for the quadrics, and the eigenvalues of the local quadrics are color-coded based on a shape of the structure that the corresponding voxel belongs to and then projected by direct volume rendering (DVR), maximum intensity projection (MIP), and/or other rendering approach to create the volumetric rendering. The resulting volumetric rendering allows the clinician to easily and accurately identify and locate structures of interest such as lymph nodes, tumors, vessels, etc. in the volumetric rendering and the original imaged data, without visually affecting the original image data.

Figure 2:
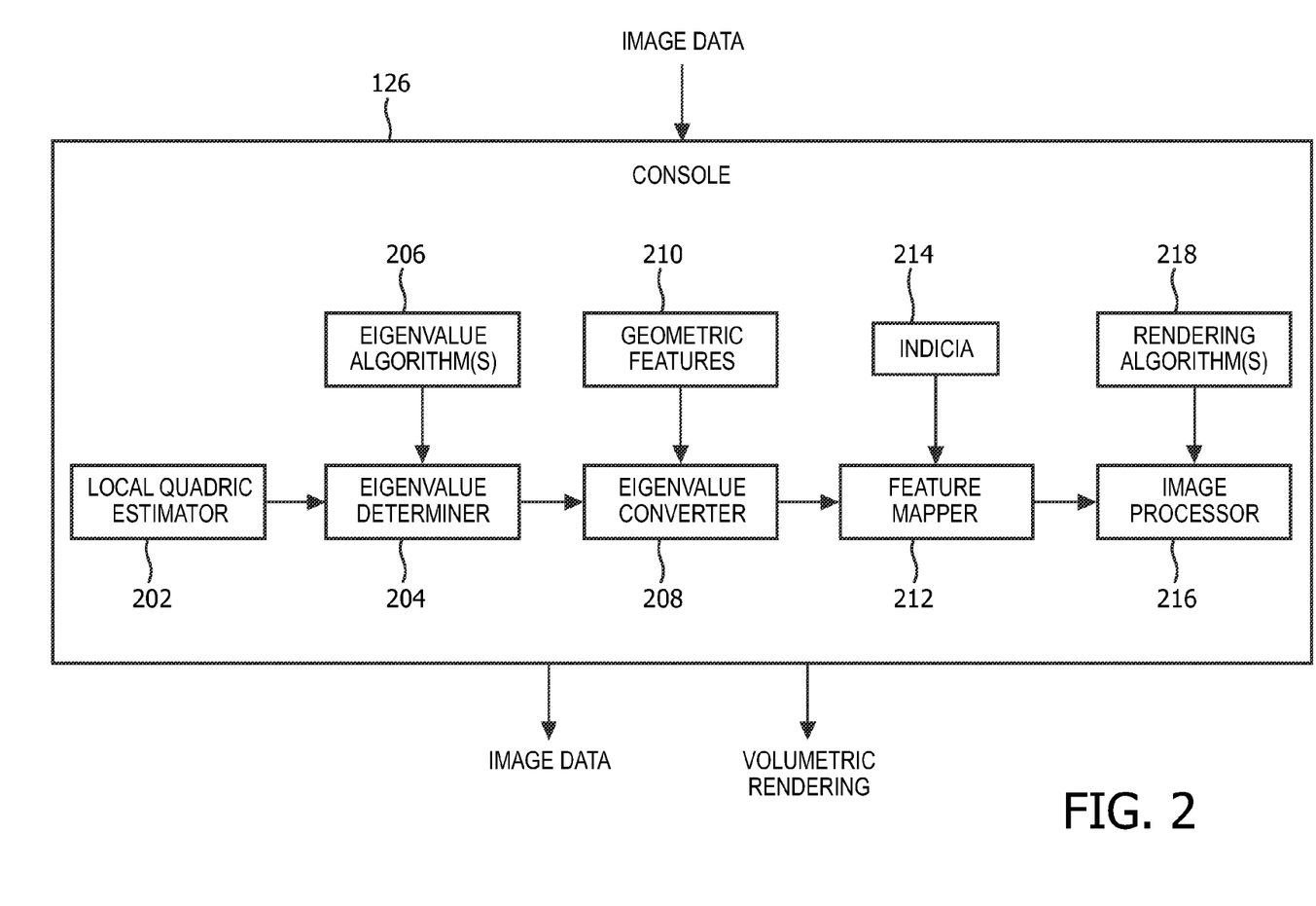
FIG. 2 illustrates an example of the one or more visualization algorithms for generating and displaying a volumetric rendering based on the image data generated by the imagine system and/or other imaging system.

FIG. 2 illustrates an example of the volumetric rendering algorithm 126.

A local quadric estimator 202 estimates a quadric for one or more of the voxels of the image data, such as for each voxel or a predetermined or user selected subset of the voxels. Generally, a quadric can be mathematically defined as an implicit surface given by the equation $x^t A x = 1$ in which A is a symmetric three-by-three (3×3) matrix, with six (6) independent coefficients. The six (6) independent matrix coefficients of a local quadric for a given voxel can be efficiently estimated by casting rays from a center or other predetermined region of the given voxel as described further below.

Each cast ray traverses one or more neighboring voxels and is terminated when predetermined criteria is satisfied. By way of example, in one instance, the predetermined criteria includes a voxel gray value, and a ray is terminated when the gray value of a voxel differs by more than a predetermined magnitude from the gray value of the given voxel from which the ray is cast. Additionally or alternatively, the ray is terminated when a voxel value variability (e.g., standard deviation or variance) along the ray rises above or falls below a predetermined threshold. Additionally or alternatively, the ray is terminated when the gradient or a change in the gradient along the ray satisfies a predetermined threshold.

The six (6) coefficients of the matrix A can then be computed using the ray lengths, either from the full axis lengths (e.g., adding the lengths of each two rays in opposite directions) or from the half axis lengths (e.g., taking a minimum or maximum length of the two opposite rays). For example, the six (6) coefficients of matrix A can be determined from lengths corresponding to twelve (12) or more rays such N rays, or N/2 directions into which the rays are cast out from the given voxel, wherein N is an integer equal to or greater than twelve (12), through solving at least six (6) simultaneous equations for the six (6) coefficients.

An eigenvalue determiner 204 determines the three (3) eigenvalues for each of the voxels based on the corresponding matrix A. The eigenvalue determiner 204 can employ various known (e.g. iterative and/or closed form solutions) and/or other eigenvalue determining algorithms 206 to determine the eigenvalues. By way of example, in one instance, the eigenvalue determiner 204 can determine an eigenvalue for the given voxel based on the matrix A by solving $A \times x = \lambda x$ for the eigenvalue $\lambda$, wherein x is a non-zero vector, which is the eigenvector of A corresponding to $\lambda$.

An eigenvalue converter 208 converts the eigenvalues into one or more predetermined geometric features 210. Suitable features 210 include, but are not limited to, tubularness (e.g., the degree the voxel represents a tubular shaped structure), blobness (e.g., the degree the voxel represents an ellipsoid shaped structure), and, optionally, at least one other geometric feature, or a non-feature. Generally, the value of an eigenvalue is inversely proportional to the length of the ray in that the longer the cast ray, the lower the value of the eigenvalue.

In the illustrated embodiment, the eigenvalue converter 208 employs the following approach to convert the eigenvalues to the one or more predetermined geometric features 210. The eigenvalues are first ordered by magnitude, for example, $|\lambda_0| \geq |\lambda_1| \geq |\lambda_2|$. Then, Tubularness (T), for a given voxel, is determined by setting $T = |\lambda_1| \cdot (|\lambda_1|/|\lambda_0|)$, and blobness (B), for the given voxel, is determined by setting $B = |\lambda_2| \cdot (|\lambda_2|/|\lambda_1|)$. If another geometric feature is also utilized, then another parameter (A) is also determined. Each of T, B, etc. will provide a value (e.g., between zero (0) and one (1), which represents a degree or likelihood for the geometric feature.

Generally, a voxel with three (3) similar significant or non-zero eigenvalues represents a blob (ellipsoidal) shaped structure, a voxel with two (2) similar significant or non-zero eigenvalues and an eigenvalue approaching or closer to zero represents a tubular shaped structure, and a voxel with two (2) eigenvalues approaching or closer to zero represents non-blob and non-tubular structure. In another embodiment, the highest eigenvalue is disregarded, and the remaining two eigenvalues are evaluated to determine whether the voxel represents a significant non-zero value or a value of about zero. It is to be understood that the above are non-limiting examples and other approaches are contemplated herein.

A feature mapper 212 maps the one or more of the features to predetermined indicia 214. An example of suitable indicia 214 includes a preset or user-defined red-green-blue (RGB) color tuple. For example, in one non-limiting example, the feature mapper 212 maps, for a given voxel, tubularness to the color red, blobness to the color yellow, other geometric feature to blue, etc. Where a voxel has a blobness value of 0.60, a tubularness value of 0.10, and the other feature value of 0.30, the RGB value will be a (weighted or unweighted) blend of 0.60 red, 0.10 blue, and 0.30 yellow. Note that these values may or may not be normalized to unity. Where a voxel has a blobness, tubularness, and other geometrical feature value of zero, the voxel retains its grey value, and no other color is assigned to it. The above are non-limiting examples, and the one or more features can be mapped to one or more other indicia such as non-color indicia.

An image processor 216 generates a volumetric rendering based on the mapped features. In the illustrated embodiment, the image processor 216 generates the volumetric rendering based one or more of the algorithms 218. Suitable algorithms 218 include, but are not limited to, direct volume rendering (DVR) and/or other algorithm. With DVR, the RGB tuple, for a given voxel, is mapped to an opacity value (A). This can be achieved via transfer function or otherwise, generating an RGBA value for a given voxel. In a non-limiting variation, the features are mapped to the colors and onto a 2D projection using a maximum intensity projection (MIP) or other approach. The various feature-MIPs are then multiplied with the feature-specific color tuples and blended (e.g. by linear combination with weight coefficients) into a combined color rendering.

As briefly noted above, the six (6) coefficients of the matrix A can be solved through simultaneous equations based on N/2 ray directions, wherein N is equal to or greater than twelve (12). N=12 rays (6 directions) is the minimum required number of rays to estimate the six (6) independent coefficients via simultaneous equations. Using N=18 rays (9 directions), the coefficients can be determined similar to the common local estimation of the Hesse matrix by finite differences, using 3 directions in the x, y, and z planes, respectively. Using N=26 rays, the coefficients can be determined casting rays towards all nearest neighbors on the x, y, z-grid. N=12, 18 and 26 may be of special interest if the ray directions are chosen such as to avoid interpolation of the gray values along the ray, which is necessary in the general case of using a fixed sampling step width along each ray.

Using N>26 rays, the coefficients can be determined using equally spaced rays to cover a sphere. Then, an over-determined system of equations with six (6) unknowns can be solved, for example, using singular value decomposition (SVD) or other approach, to fit the quadric matrix. Alternatively, the coefficients can be determined by computing a spatial covariance matrix $\Sigma$ (3×3) of the ray endpoint positions (or ellipsoid of inertia) and inverting the matrix $\Sigma$. For N=12, 18 and 26, only gray values from integer coordinates of the input image volume grid are evaluated. N>26 provides higher robustness relative to N=12, 18 and 26, particularly on non-isotropic datasets, but are computationally more expensive.

By way of further example, for N=12, the directions on the x, y, and z-grid can be chosen as $D_{xyz}$:

$D_{+oo}D_{++o}$ $D_{o+o}D_{o++}$ $D_{oo+}D_{+o+}.$

Along each direction D, the axis length L is measured by ray casting. Thus, a point x on the quadric surface is given by x=DL. Insertion into the quadric equation yields: (LD)A(LD)= L²·DAD=1, and, thus, DAD=L⁻².

The matrix coefficients Ay can be derived from the axis lengths L as:

$A_{00}=L_{+}^{-2}$ $A_{11}=L_{o+o}^{-2}$ $A_{22}=L_{oo+}^{-2}$ $A_{01}=A_{10}=L_{++o}^{-2}-(L_{+oo}^{-2}+L_{o+o}^{-2})/2$ $A_{02}=A_{20}=L_{+o+}^{-2}-(L_{+oo}^{-2}+L_{oo+}^{-2})/2$ $A_{12}=A_{21}=L_{o++}^{-2}-(L_{o+o}^{-2}+L_{oo+}^{-2})/2.$

For N=18, the directions on the x, y, and z-grid can be chosen as $D_{xyz}$:

$D_{+oo}D_{++o}D_{+-o}$ $D_{o+o}D_{o++}D_{o+-}$ $D_{oo+}D_{+o+}D_{-o+},$ and the matrix coefficients Ay can be derived from the axis lengths L as:

$A_{00}=L_{+oo}^{-2}$ $A_{11}=L_{o+o}^{-2}$ $A_{22}=L_{oo+}^{-2}$ $A_{01}=A_{10}=(L_{++o}^{-2}-L_{+-o}^{-2})/2$ $A_{02}=A_{20}=(L_{+o+}^{-2}-L_{+o-}^{-2})/2$ $A_{12}=A_{21}=(L_{o++}^{-2}-L_{o+-}^{-2})/2.$

Figure 3:
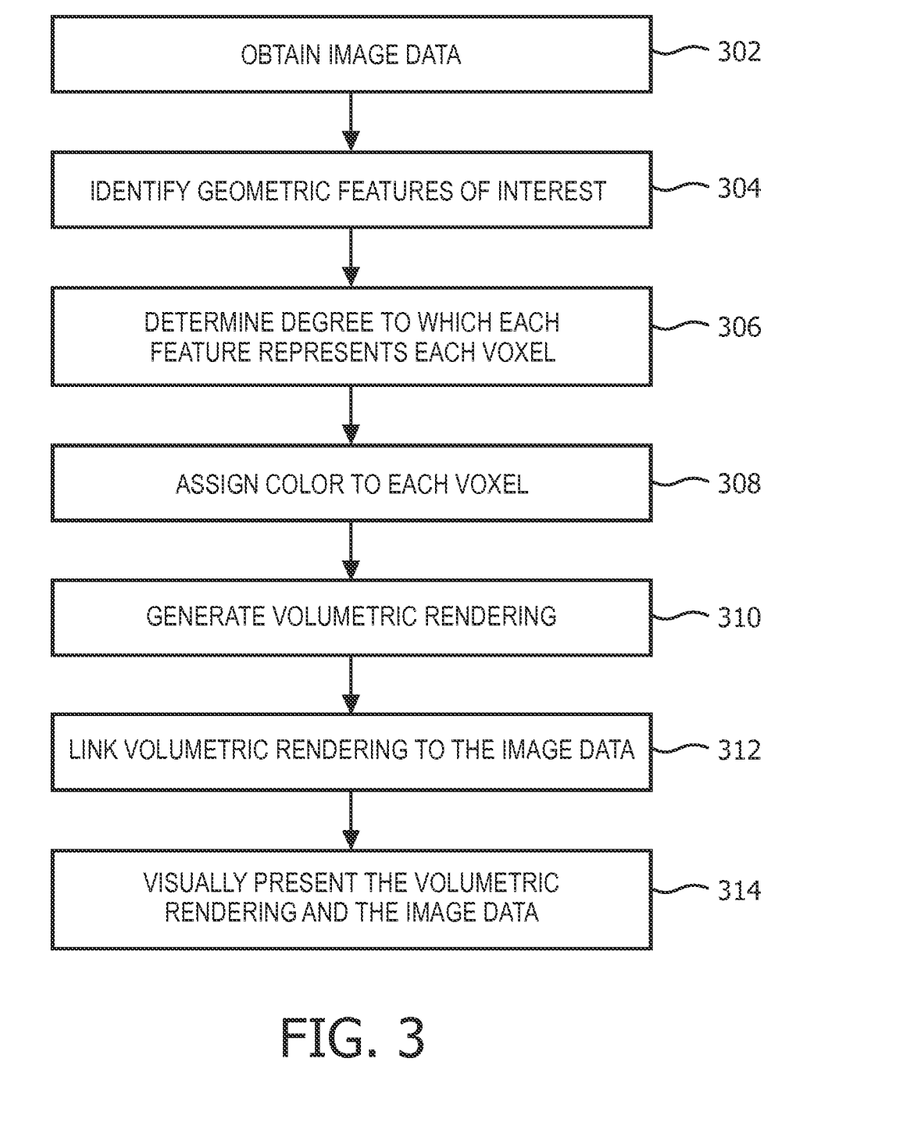
FIGS. 3 and 4 illustrate example methods for generating and displaying a volumetric rendering based on the image data generated by the imagine system and/or other imaging system.

FIG. 3 illustrates a method for generating and displaying a volumetric rendering based on the image data.

It is to be appreciated that the ordering of the below acts is for explanatory purposes and not limiting. As such, other orderings are also contemplated herein. In addition, one or more of the acts may be omitted and/or one or more other acts may be included.

At 302, image data is obtained. The image data can be generated by the system 100 or other imaging system.

At 304, a plurality of geometrical features is identified and assigned different colors. Examples of geometrical features, include, but are not limited to, one or more of blobness or tubularness, and/or other feature.

At 306, a degree to which each of a plurality of voxels of the image data corresponds to each of the geometrical features is determined.

At 308, a color value for each voxel is assigned based on the degrees and the corresponding colors of each geometric feature.

At 310, a volumetric rending of the image data is generated based on the color values for each voxel.

At 312, the volumetric rendering is linked to the image data.

At 314, the volumetric rendering and the image data are concurrently visually presented.

Figure 4:
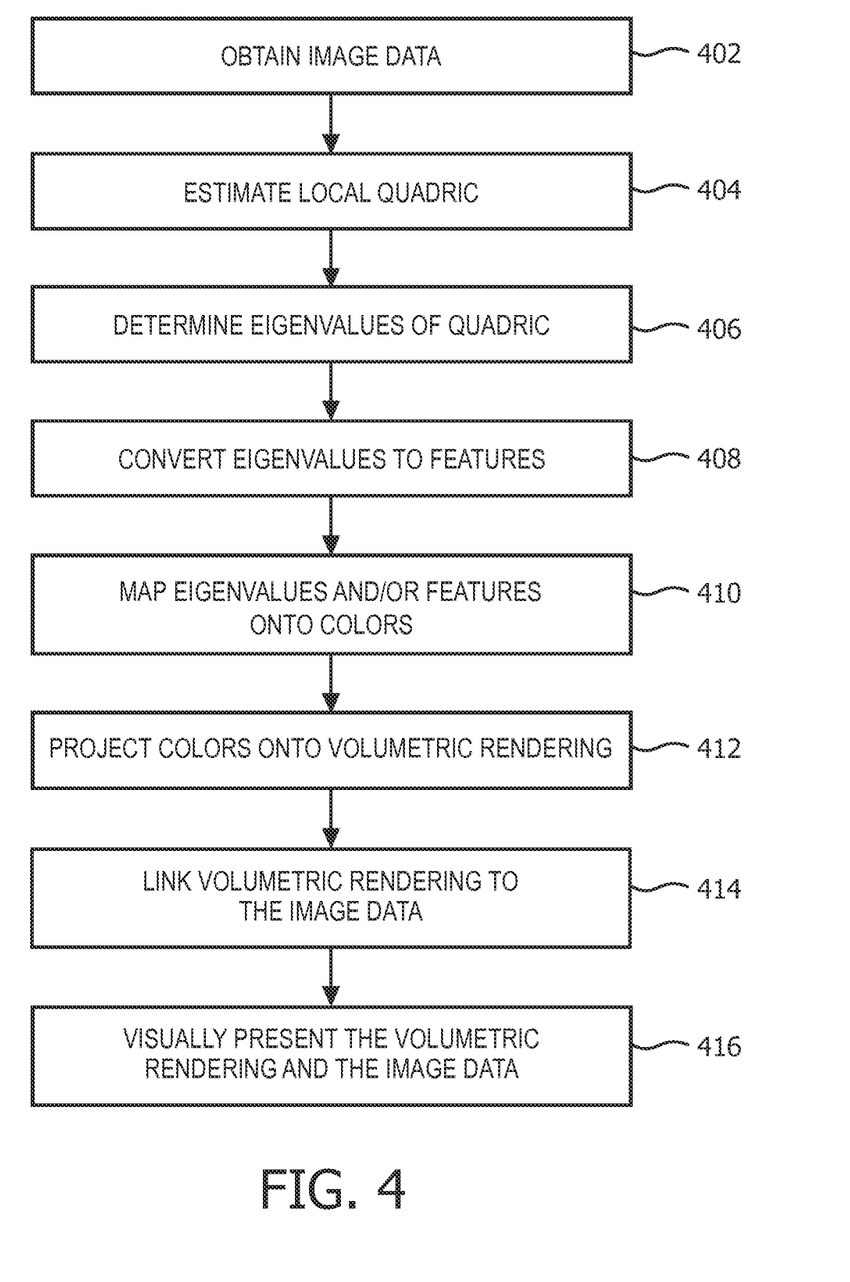

FIG. 4 illustrates a method for generating and displaying a volumetric rendering based on the image data.

It is to be appreciated that the ordering of the below acts is for explanatory purposes and not limiting. As such, other orderings are also contemplated herein. In addition, one or more of the acts may be omitted and/or one or more other acts may be included.

At 402, image data is obtained, as described herein.

At 404, a local quadric is estimated independently for each voxel (or a sub-set thereof) of the image data.

At 406, the eigenvalues of the local quadric are determined.

At 408, the eigenvalues are converted into one or more features (e.g. tubularness, blobness, etc).

At 410, the eigenvalues and/or the features are mapped onto colors.

At 412, the colors of the voxels of the image data are projected onto a volumetric rendering.

At 414, the volumetric rendering is linked to the image data.

At 416, the volumetric rendering and the image data are concurrently visually presented.

The methods described herein may be implemented by way of computer readable instructions, which when executed by a computer processor(s), cause the processor(s) to carry out the described acts.

It is to be appreciated that by generating and displaying the volumetric rendering, graphical markers do not have to be applied to the image data, avoiding cluttering of the image data and viewer distraction. In addition, no discrete labeling has to be made or decisions of voxels, which may mitigate or reduce a false positive rate. Furthermore, internal object lists and/or segmentations can be omitted.

Moreover, in contrast to, for example, renderings of the local Hessian eigenvalues, the local quadrics are less noise sensitive (0- instead of 2nd derivative), can distinguish objects which are very close together (in comparison to their diameter), and can emphasize objects of different size scale without having to build a scale space (memory and computation expensive)

As an alternative embodiment, the ray casting outwards from the central voxel can be used to construct a matrix of second moments in which all voxel positions along each ray are accumulated into a second moments matrix M, each voxel position weighted with its grey value: $M[i,j]=I(x)*x_i*x_j$, where I is the image intensity (e.g., grey value) at position $x=(x_0, x_1, x_2)$, and the subscripts i and j can be 0,1,2, i.e., x,y,z. Generally, an image moment is a certain particular weighted average of the image pixels' intensities, or a function of such moments.

The ratios of the moments can quantify the degree to which a body is more spherical (e.g., blob-like, or tumor like) or more elongated (e.g., tubular, or vessel-like). With intensity-weighted moments, the rays do not have to be terminated at a certain stopping criterion, and the gray-value distribution along the rays is evaluated. By means of the second moments, these distributions can be condensed into a 3×3 matrix. The moments matrix can be computed for all or a predetermined sub-set of the voxels in a given range.

In one embodiment, the moments are approximated by summing only voxels along the rays cast out from the central voxel. Optionally, the grey values I(x) along each ray can be modified such, that each grey value is clamped to the maximum of the grey values from the center position to the current position: $I_{min}(x)=\min(I(x), I(x'))$ for all positions x' with a distance d' to the center smaller then the distance d of position x. This may mitigate adverse effects from unconnected but closely neighboring objects.

After the second moments matrix M has been computed, its eigenvalues are determined, and either directly mapped onto associated colors, or first converted into features such as tubularness, blobness, etc., and then mapped onto colors, as described herein. This embodiment has been discussed in connection with the second moments matrix, however, it is to be appreciated that higher order moments (e.g., the fourth moments (kurtosis) or other moments) can alternatively be used.

Although described above in connection with computed tomography (CT), it is to be appreciated that the above is also applicable to other imaging modalities such as, but not including, positron emission tomography (PET), single photon emission tomography (SPECT), magnetic resonance imaging (MRI), ultrasound (US), three dimensional (3D) x-ray, and/or other imaging modalities.

The invention has been described herein with reference to the various embodiments. Modifications and alterations may occur to others upon reading the description herein. It is intended that the invention be construed as including all such modifications and alterations insofar as they come within the scope of the appended claims or the equivalents thereof.

The invention claimed is:

1. A method, comprising:
obtaining image data generated by an imaging system;
generating data indicative of a degree to which each of a plurality of voxels of the image data corresponds to one or more predetermined geometrical features, wherein each geometrical feature is assigned a different color, the one or more geometrical features includes at least one of blobness and tubularness, and a given voxel of the data has a degree of blobness and a degree of tubularness;
estimating a quadric for each of the plurality of voxels, wherein the quadric includes a matrix of coefficients;
determining eigenvalues of the quadrics, based on the matrix of coefficients, including three eigenvalues, first, second and third eigenvalues;
determining the degree for the voxels based on the eigenvalues, wherein a degree of blobness is determined as product of the second eigenvalue and a ratio of second eigenvalue to the first eigenvalue, and a degree of tubularness is determined as a product of the third eigenvalue and a ratio of third eigenvalue to the second eigenvalue;
generating a signal indicative of a single color value for each of the plurality of voxels based on the degree and the colors;
generating a volumetric rending of the image data based on the signal;
generating a link between voxels of the volumetric rendering and voxels of the image data; and
visually presenting the image data and the volumetric rendering concurrently.

2. The method of claim 1, wherein the color value for the given voxel is a blend of a first color for blobness and a second color for tubularness, in proportion to the degrees of blobness and tubularness for the voxel.

3. The method of claim 1, wherein at least one of the eigenvalues or the features is mapped to the colors.

4. The method of claim 1, wherein three substantially equal non-zero eigenvalues indicates a higher degree of blobness, two substantially equal non-zero eigenvalues and one eigenvalue having a value of about zero indicates a higher degree of tubularness and two eigenvalues having values of about zero indicates a higher degree of non-blobness and non-tubularness.

5. The method of claim 1, estimating the quadric for the voxel, comprising:

casting a plurality of rays from the voxel, wherein each ray is cast in a different direction and traverses neighboring voxels of the image data;
terminating a cast ray in response satisfying predetermined stopping criteria;
determining a length of each cast ray; and
determining the matrix of coefficients based on the different directions and the determined lengths.

6. The method of claim 1, estimating the quadric for the voxel, comprising:
casting a plurality of rays from the voxel, wherein each ray is cast in a different direction and traverses neighboring voxels of the image data; and
determining the matrix of coefficients by constructing a matrix of moments based on a gray-value distribution along the rays.

7. The method of claim 5, further comprising:
solving a plurality of simultaneous equations to determine the matrix of coefficients.

8. The method of claim 5, further comprising:
disregarding an eigenvalue of the three eigenvalues with the highest value; and evaluating the remaining two eigenvalues to determine whether a voxel represents a non-zero value or a value of zero.

9. The method of claim 1, further comprising:
mapping the eigenvalues for a voxel to a color; and
projecting the color onto a portion of the volumetric rendering representing the voxel.

10. The method of claim 1, further comprising:
converting the eigenvalues for a voxel to the one or more geometric features;
mapping the one or more geometric features to a color; and
projecting the colors corresponding to the geometric features onto a portion of the volumetric rendering representing the geometric features.

11. The method of claim 1, further comprising:
receiving an input indicative of a user selected region of interest of the volumetric data; and
determining a corresponding sub-region in the image data based on the link; and
displaying the sub-portion of the image data corresponding to the user selected region of interest in the volumetric data.

12. A computing system, comprising:
a non-transitory computer readable storage medium, including one or more instructions corresponding to at least one volume rendering algorithm; and
one or more processors configured to execute the one or more instructions to;
obtain image data generated by an imaging system;
generate data indicative of a degree to which each of a plurality of voxels of the image data corresponds to one or more predetermined geometrical features, wherein each geometrical feature is assigned a different color, the one or more geometrical features includes at least one of blobness and tubularness, and a given voxel of the image data has a degree of blobness and a degree of tubularness;
estimate a quadric for each of the plurality of voxels, wherein the quadric includes a matrix of coefficients;
determine eigenvalues of the quadrics, based on the matrix of coefficients, including three eigenvalues, first, second and third eigenvalues;
determine the degree for the voxels based on the eigenvalues, wherein a degree of blobness is determined as product of the second eigenvalue and a ratio of second eigenvalue to the first eigenvalue, and a degree of tubularness is determined as a product of the third eigenvalue and a ratio of third eigenvalue to the second eigenvalue
generate a signal indicative of a single color value for each of the plurality of voxels based on the degree and the colors;
generate a volumetric rending of the image data based on the signal;
generate a link between voxels of the volumetric rendering and voxels of the image data; and
visually present the image data and the volumetric rendering concurrently.

13. The system of claim 12, wherein the one or more processors estimates the quadric for a voxel by casting a plurality of rays from the voxel in different directions, terminating each ray in response to predetermined stopping criteria, determining a length of each cast ray, and determining the matrix of coefficients of the quadric based on the different directions and the determined lengths.

14. The system of claim 13, wherein the one or more processors determines the eigenvalues for the voxel based on the matrix of coefficients, maps to the eigenvalues to colors from a predetermined set of colors, and projects the colors onto a portion of the volumetric rending corresponding to the voxel.

15. The system of claim 13, wherein the one or more processors determines the eigenvalues for the voxel based on the matrix of coefficients, maps to the eigenvalues to one or more predetermined geometric features, maps the one or more geometric features to colors from a predetermined set of colors, and projects the colors onto a portion of the volumetric rending corresponding to the voxel.

16. The system of claim 15, wherein the color corresponds to a blend of a first color representing a degree of blobness of the voxel and a second color representing a degree of tubularness of the voxel.

17. A non-transitory computing readable storage medium encoded with computer readable instructions, which, when executed by one or more processors of a computing system, cause the computing system to:
obtain image data generated by an imaging system;
generate data indicative of a degree to which each of a plurality of voxels of the image data corresponds to one or more predetermined geometrical features, wherein each geometrical feature is assigned a different color, the one or more geometrical features includes at least, one of blobness and tubularness, and a given voxel of the image data has a degree of blobness and a degree of tubularness;
estimate a quadric for each of the plurality of voxels, wherein the quadric includes a matrix of coefficients;
determine eigenvalues of the quadrics, based on the matrix of coefficients, including three eigenvalues, first, second and third eigenvalues;
disregarding an eigenvalue of the three eigenvalues with the highest value;
evaluating the remaining two eigenvalues to determine whether a voxel represents a non-zero value or a value of zero;
determine the degree for the voxels based on the eigenvalues;
generate a signal indicative of a single color value for each of the plurality of voxels based on the degree and the colors;
generate a volumetric rending of the image data based on the signal;
generate a link between voxels of the volumetric, rendering and voxels of the image data; and visually present the image data and the volumetric rendering concurrently.

\* \* \* \* \*